US006961694B2

United States Patent
Schmid et al.

(10) Patent No.: US 6,961,694 B2
(45) Date of Patent: Nov. 1, 2005

(54) METHOD AND APPARATUS FOR REDUCING LATENCY IN SPEECH-BASED APPLICATIONS

(75) Inventors: Philipp H. Schmid, Seattle, WA (US); Adrian Garside, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 09/767,093

(22) Filed: Jan. 22, 2001

(65) Prior Publication Data

US 2002/0099535 A1 Jul. 25, 2002

(51) Int. Cl.$^7$ .............................................. G06F 17/27
(52) U.S. Cl. ..................... 704/9; 704/257; 704/1; 704/255; 704/4; 704/10
(58) Field of Search ................... 704/257, 9, 4, 704/255, 1, 10

(56) References Cited

U.S. PATENT DOCUMENTS

| | | | | |
|---|---|---|---|---|
| 4,887,212 A | * | 12/1989 | Zamora et al. .................. | 704/8 |
| 4,994,966 A | * | 2/1991 | Hutchins ........................ | 704/9 |
| 5,555,169 A | * | 9/1996 | Namba et al. .................. | 704/9 |
| 5,621,859 A | * | 4/1997 | Schwartz et al. ............ | 704/256 |
| 5,642,519 A | * | 6/1997 | Martin ........................... | 704/9 |
| 5,870,706 A | * | 2/1999 | Alshawi ...................... | 704/255 |
| 6,173,266 B1 | * | 1/2001 | Marx et al. .................. | 704/270 |
| 6,282,507 B1 | * | 8/2001 | Horiguchi et al. .............. | 704/3 |
| 6,292,767 B1 | * | 9/2001 | Jackson et al. ................. | 704/1 |
| 6,745,181 B1 | * | 6/2004 | Chang et al. ................... | 707/4 |
| 6,836,760 B1 | * | 12/2004 | Bellegarda et al. ......... | 704/257 |

OTHER PUBLICATIONS

W. Minker et al., "A Stochastic Case Frame Approach for Natural Language Understanding," Proceedings ICSLP 96. Fourth International Conference on Spoken Language Processing, Part vol. 2, pp. 1013–16 (Oct. 3–6, 1996).

T. Kawahara et al., "Flexible Speech Understanding Based on Combined Key–Phrase Detection and Verification, " *IEEE Transactions on Speech and Audio Processing,* vol. 6, No. 6, pp. 558–68 (Nov. 1998).

T. Kawahara et al. "Heuristic Search Integrating Syntactic, Semantic and Dialog–Level Constraints, " Proceedings of ICASSP 94. IEEE International Conference on Acoustics, Speech and Signal Processing, Part vol. 2, p. II/25–8, (Apr. 19–22, 1994).

H. Vogt et al. "Efficient Incremental Evaluation of Higher Order Attribute Grammers", Programming Language Implementation and Logic Programming, 3$^{rd}$ International Symposium, PLILP '91 Proceedings, pp. 231–42 (Aug. 26–28, 1991).

D. Partridge, "A Syntactic View of Semantic Networks, " *International Journal of Man–Machine Studies,* vol. 10, No. 2, pp. 113–19 (Mar. 1978).

* cited by examiner

*Primary Examiner*—David L. Ometz
*Assistant Examiner*—Minerva Rivero
(74) *Attorney, Agent, or Firm*—Theodore M. Magee; Westman, Champlin & Kelly, P.A.

(57) ABSTRACT

A speech recognition interface and computer-readable medium build a grammar for speech recognition that reduces latency in speech-based applications. The interface and medium receive instructions to add a new phrase and semantic information to a grammar. The new phrase is combined with at least one other phrase in the grammar to form a composite grammar structure. The semantic information is then associated with a single word or transition in the grammar structure by selecting the first possible word or transition that semantically differentiates the new phrase from all other phrases in the grammar structure. By placing the semantic information in this position, the semantic information is placed as far forward in the grammar as possible without introducing semantic ambiguity into the grammar structure.

24 Claims, 7 Drawing Sheets

METHOD AND APPARATUS FOR REDUCING LATENCY IN SPEECH-BASED APPLICATIONS

BACKGROUND OF THE INVENTION

The present invention relates to the construction of grammars used in speech recognition. In particular, the invention relates to the construction of grammars that include semantic tags.

In speech recognition systems, a computer system attempts to identify a sequence of words from a speech signal. One way to improve the accuracy of the recognition is to limit the recognition to a set of selected phrases. This is typically done by limiting valid recognition hypothesis to phrases that are found in a context-free grammar (CFG).

In some speech recognition systems, the context-free grammar is augmented by associating semantic tags and their corresponding values to words or phrases in the grammar. With such augmented systems, the semantic information is returned to an application along with the recognized phrase. This allows the application to take action based on the semantic information without having to first translate the recognition of the phrase into some semantic value.

In prior art systems, the semantic tag and value are only passed to the application after a complete utterance has been recognized. However, the semantic meaning of the utterance may be apparent earlier in the utterance. Since the recognition engine identifies the end of an utterance by detecting some period of silence, at a minimum, the user must wait through the silence period before the application takes action on the speech signal.

This delay is perceivable and annoying to users. As such, a speech recognition system is needed that allows applications to take actions before an utterance has been completely recognized.

SUMMARY OF THE INVENTION

A speech recognition interface and computer-readable medium build a grammar for speech recognition that reduces latency in speech-based applications. The interface and medium receive instructions to add a new phrase and semantic information to a grammar. The new phrase is combined with at least one other phrase in the grammar to form a composite grammar structure. The semantic information is then associated with a single word or transition in the grammar structure by selecting the first possible word or transition that differentiates the new phrase from all semantically different phrases in the grammar structure. By placing the semantic information in this position, the semantic information is placed as far forward in the grammar as possible without introducing semantic ambiguity into the grammar structure.

Another aspect of the present invention is speech-based applications that are capable of taking actions based on semantic information returned by a speech recognition system before the system has recognized an entire utterance. These applications determine whether to take an action based on semantic information returned for a hypothesis word identified by the speech recognition system. When determining whether to take the action, the applications balance the risk of harm of incorrectly taking the action with the confidence score attributed to the semantic information.

DETAILED DESCRIPTION OF ILLUSTRATIVE EMBODIMENTS

Figure 1:
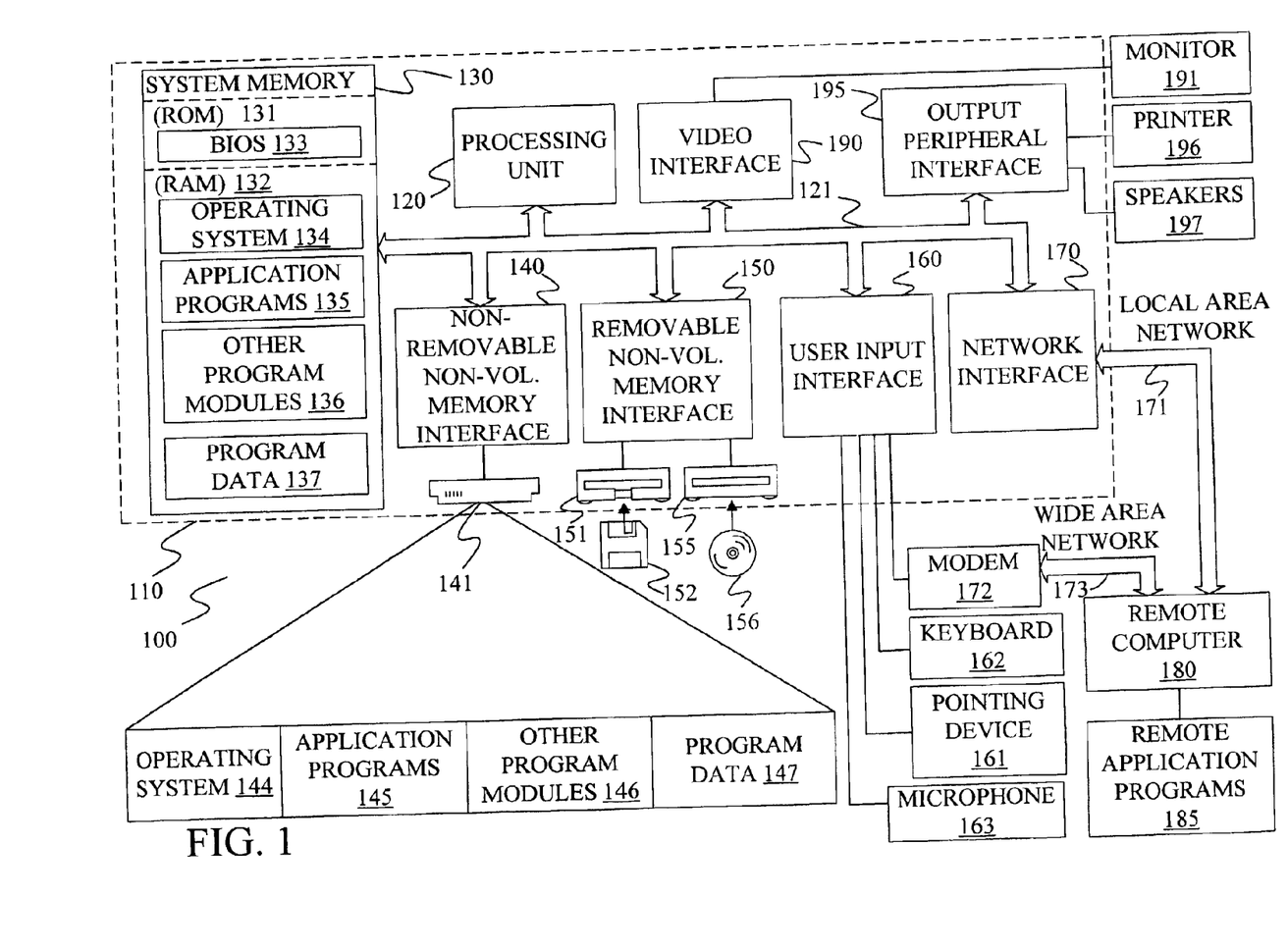
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
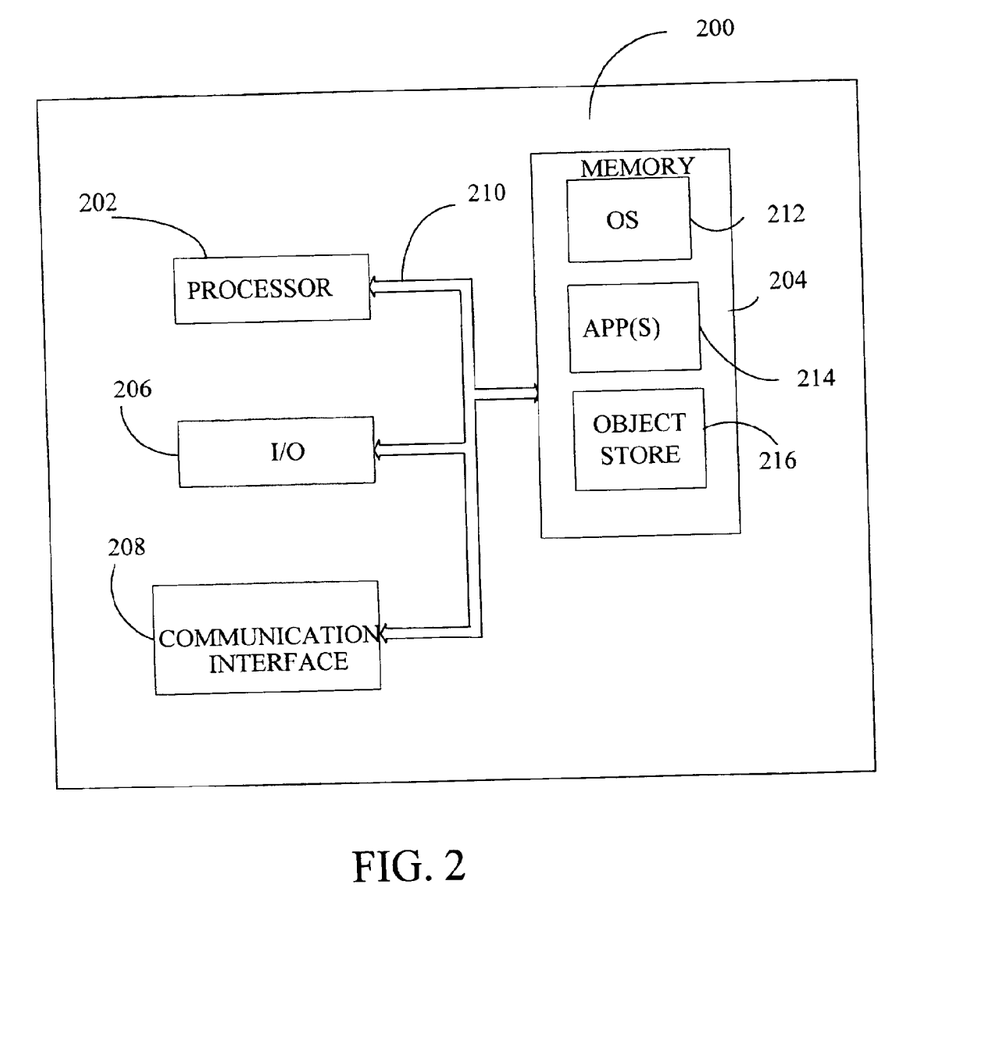
FIG. 2 is a block diagram of a mobile device in which the present invention may be practiced.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
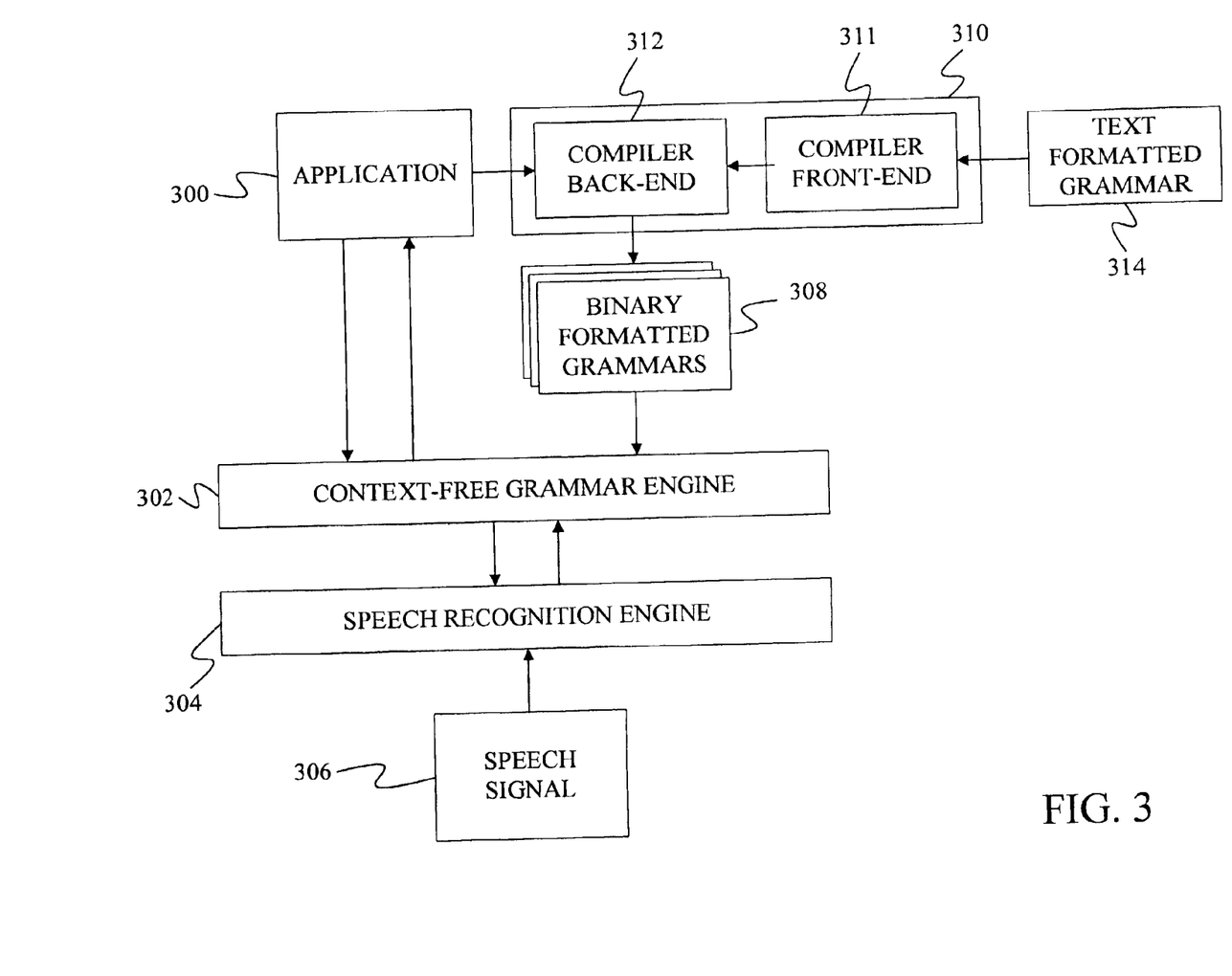
FIG. 3 is a block diagram of a speech recognition system under the present invention.

FIG. 3 provides a block diagram of a speech recognition system under one embodiment of the present invention. In FIG. 3, an application 300 utilizes a context-free grammar engine 302 and a speech recognition engine 304 to identify words and/or semantic meaning from a speech signal 306 that is provided to speech recognition engine 304. Specifically, during speech recognition, speech recognition engine 304 determines the likelihood that speech signal 306 represents one or more possible phrases found in a composite grammar maintained by context-free grammar engine 302.

Under one embodiment, the composite grammar in context-free grammar engine 302 is organized as a recursive transition network (RTN) that includes a collection of grammar structures known as rules. Each rule contains a collection of transitions that define one or more paths from a starting state to an ending state for the rule. Under these embodiments, each transition corresponds to the recognition of a recognition value such as a single word, the lack of a word (known as an epsilon transition), or the recognition of some other rule (known as a rule reference).

The composite grammar maintained by context-free grammar engine 302 is constructed from a collection of binary grammars 308 that are formed by a compiler 310. Compiler 310 includes a front end 311 and a back end 312. Compiler front-end 311 converts text-formatted grammars 314, which in one embodiment are XML tagged grammars, into a set of instructions for building a binary grammar. These instructions are passed to compiler back-end 312 and direct back-end 312 to build binary structures that represent particular rules (grammar structures) in a grammar.

In embodiments where the composite grammar is a recursive transition network, the instructions define new rules to be added to the network and the location and content of transitions to be added to each rule. Thus, the instructions indicate whether a transition is associated with a word, a lack of a word (an epsilon transition) or a rule. The instructions also indicate the identity of any semantic tag/semantic value pair that is to be associated with the transition.

Figure 4:
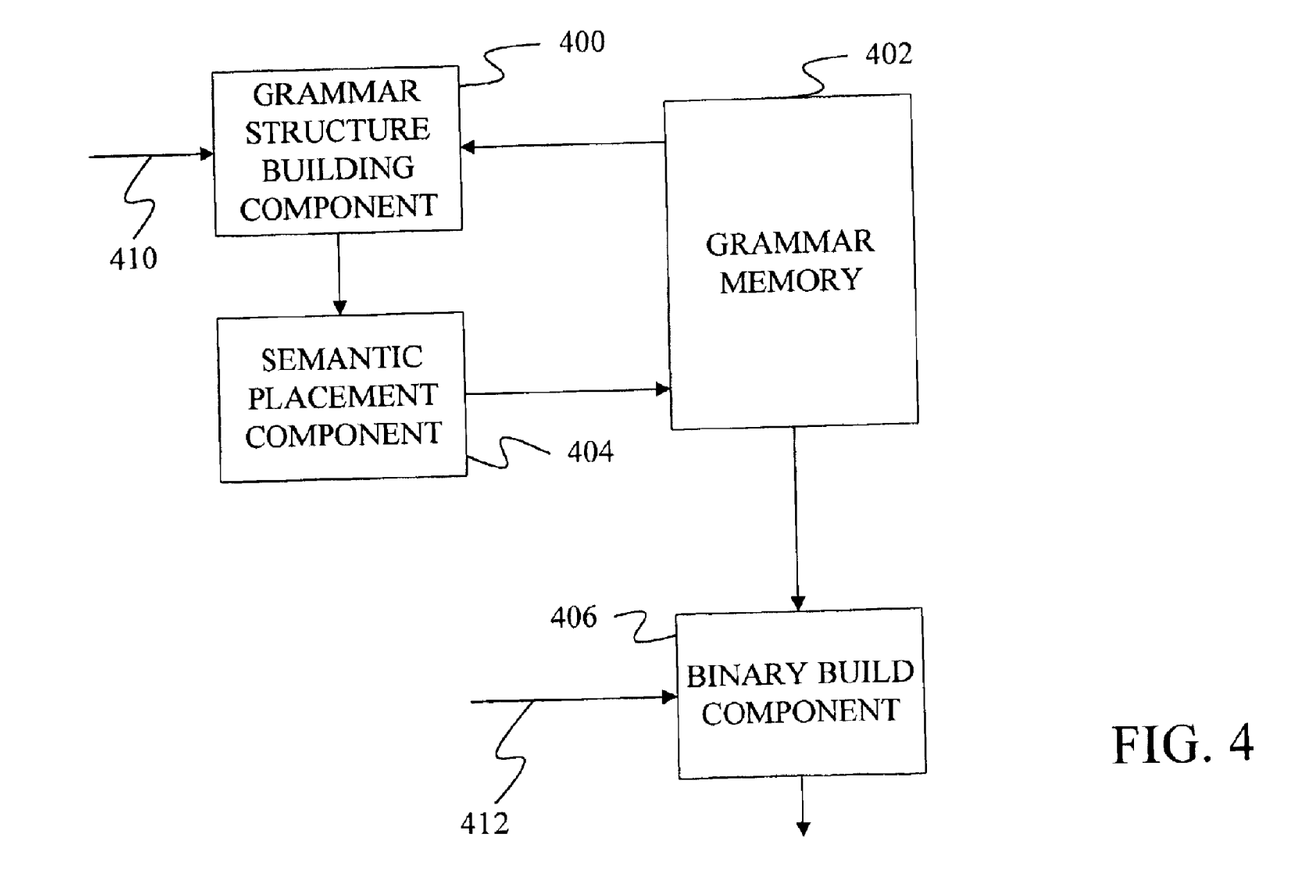
FIG. 4 is a block diagram of components in compiler back-end 412 of FIG. 4.

FIG. 4 shows a block diagram of some of the components that form compiler back-end 312 under some embodiments of the present invention. In FIG. 4, a grammar structure building component 400 receives instructions 410 to add transitions to a grammar structure stored in a grammar memory 402. After a transition has been added, a semantic placement component 404 is called that identifies the best location for semantic information associated with the current transition and/or the current grammar structure. As discussed below, semantic placement component 404 will shift semantic information within a grammar structure in an attempt to move semantic information to the earliest possible transitions in the grammar structure without introducing semantic ambiguity. The changes in the location of the semantic information are reflected in grammar memory 402.

When compiler front-end 311 reaches the end of the text-formatted grammar, it instructs back-end 312 to commit the grammar. When it receives this instruction, shown as instruction 412 in FIG. 4, a binary build component 406 of back-end 312 takes the current form of the grammar in grammar memory 402 and constructs a compact binary representation 308 of the grammar. In one embodiment, binary representation 308 takes the form of a collection of tables that describe the recursive transition network.

Compiler back-end 312 may also receive grammar-building instructions directly from application 300 at run time. These instructions are generated by the application to produce one or more run-time grammars that are then added to the composite grammar used by context-free grammar engine 302. Like compiler front-end 311, application 300 is able to specify semantic tag/semantic value pairs for transitions that it wants added to the grammar.

During recognition, speech recognition engine 304 compares sections of the speech signal to acoustic models representing a set of phonetic units that can be spoken in the language of interest. From these comparisons, engine 304 identifies sequences of phonetic units that could be represented by the speech signal. When identifying the possible sequences, recognition engine 304 eliminates those sequences that do not occur in at least one of the grammar structures of the composite grammar.

Under most embodiments, recognition engine 304 periodically provides a hypothesis of the current word it is trying to recognize to context-free grammar engine 302. Under one embodiment, recognition engine 304 actually returns the identity of the transition associated with the word it selects as its hypothesis. Using this transition ID, grammar engine 302 retrieves any semantic tag/semantic value pair associated with the transition and returns the word and the tag/value pair to application 300 as a hypothesis.

In some embodiments, speech recognition engine 304 also returns a confidence score that indicates how likely it is that the hypothesized word is actually represented by the speech signal. This confidence score is provided to application 300 through grammar engine 302 and, under the present invention, is used by application 300 as part of a risk/reward calculation to determine whether the recognition confidence is high enough to justify taking an action before the recognition is fully completed. Such risk/reward determinations are described in more detail below.

Under the present invention, an application's ability to take actions based on the hypotheses returned by the speech recognition engine is enhanced by shifting semantic tag/ semantic values forward in the grammar structures. This shifting is done by compiler back-end 312 with each new transition it adds to the grammar structure. Under the invention, a semantic tag/semantic value pair is placed as far forward in a rule as it can be without creating an ambiguity with some other transition in the rule. In addition, as new transitions are added to a rule, the present invention shifts existing tag/value pairs within the rule to prevent semantic ambiguities. This shifting is discussed below with reference to the flow diagram of FIG. 5 and the transition network diagrams of FIGS. 6, 7, 8, 9 and 10.

Figure 5:
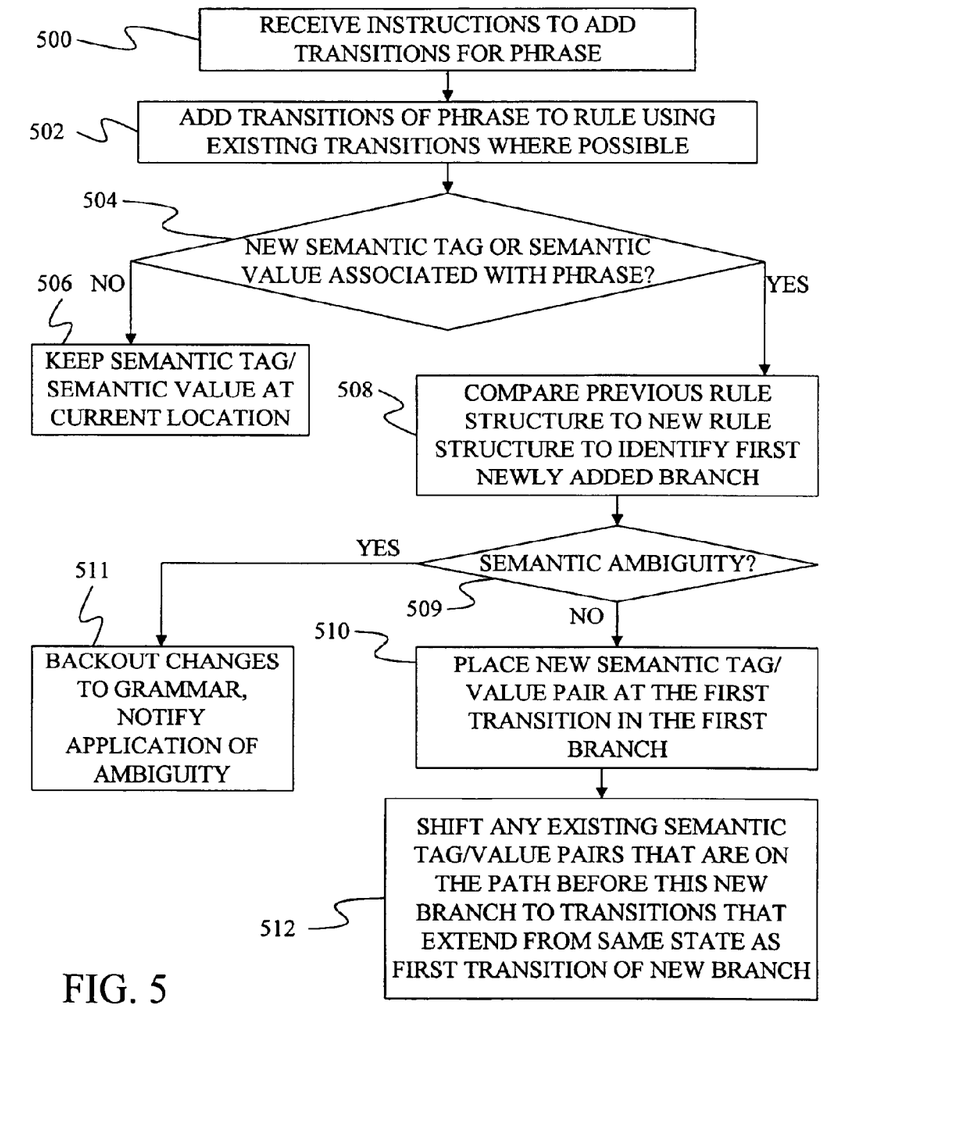
FIG. 5 is a flow diagram for shifting semantic information in grammar structures under one embodiment of the present invention.
Figure 6:
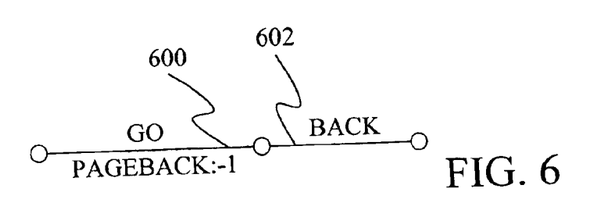
FIG. 6 is a state diagram showing a grammar structure for a single phrase in a grammar rule.

At step 500 of FIG. 5, compiler back-end 312 receives instructions to add transitions for a phrase to a grammar. In FIG. 6, this phrase is the short phrase "go back", which has an associated semantic tag/semantic value pair of "pageback:–1" where "pageback" is the semantic tag and "–1" is the value.

At step 502 of FIG. 5, the transitions for the new phrase are added to the rule identified in the instructions. For a new rule, as is the case in FIG. 6, the transitions are inserted directly. Thus, transition 600 is added for the word "go" and transition 602 is added for the word "back".

For an existing rule, compiler back-end 312 attempts to reuse as many existing transitions as possible in the current rule. For example, in FIG. 7 compiler back-end 312 has been instructed to add the phrase "go back a page" to the rule of FIG. 6. To do this, compiler back end 312 reuses transitions 600 and 602 and adds new transitions 700, 702, and 704. New transition 700 is an epsilon transition indicating that no words need to be identified during the transition in order for the rule to be recognized. This epsilon transition allows the speech recognition engine to continue to recognize the short phrase "go back". Transitions 702 and 704 add the sub-phrase "a page" to "go back" to produce the complete phrase "go back a page".

At step 504 of FIG. 5, compiler back-end 312 determines whether a semantic tag or semantic value associated with the newly added phrase is different than a semantic tag or semantic value that was previously present along a common transition that is used by both the newly added phrase and at least one existing phrase in the rule. If the semantic tag and semantic value for the new phrase are the same as an existing semantic tag and semantic value pair found on a common transition, the location of the existing semantic tag and semantic value is maintained.

Figure 7:
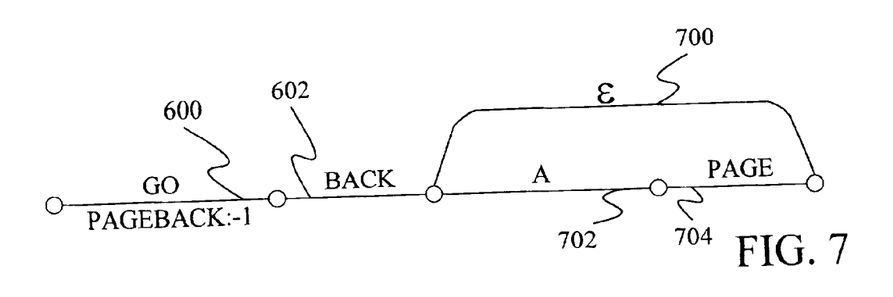
FIG. 7 shows the state diagram of FIG. 6 after an additional phrase has been added to the grammar rule.

This is shown as step 506 in FIG. 5 and an example of this is shown in FIG. 7 where the newly added phrase "go back a page" has the same semantic tag and semantic value, "pageback:–1", that was found on common transition 600. As such, "pageback:–1" is maintained at transition 600.

Note that maintaining the common semantic tag/semantic value pair at its current position when adding a new phrase keeps the semantic tag/semantic value pair as far forward in the rule as possible. Since a transition that is forward in a rule will be identified in a hypothesis before a later transition, keeping the semantic pair in this forward position allows the semantic pair to be provided to the application sooner than if it was shifted back to a later transition.

Figure 8:
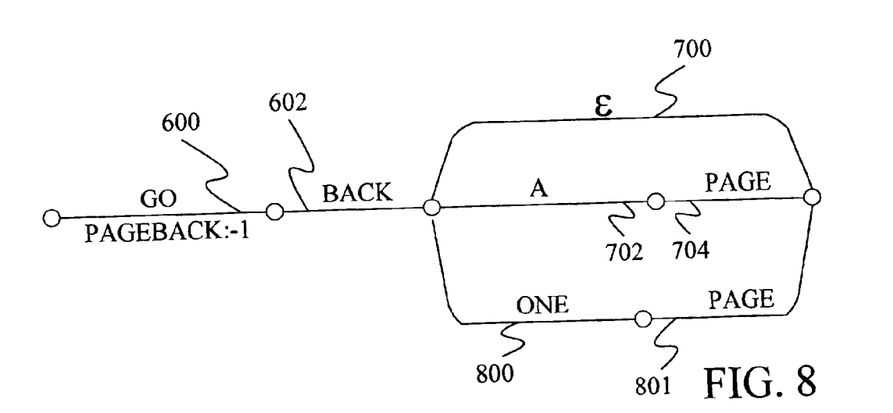
FIG. 8 shows the state diagram of FIG. 7 after an additional phrase has been added to the grammar rule.

FIG. 8 shows the changes made to the rule of FIG. 7 when compiler back-end 312 receives instructions to add the phrase "go back one page" with a semantic pair of "pageback:–1". Note that this additional phrase can be represented by the structure of FIG. 7 by simply adding two transitions 800 and 801 for the words "one" and "page" in parallel with existing transitions 702 and 704 for the words "a" and "page". This can be done because the only difference between the phrase "go back one page" and the phrase "go back a page" is the substitution of "one" for "a". Note that because the semantic pair in the new phrase is the same as the existing semantic pair along the path of the new phrase, the position of the existing semantic pair is maintained in FIG. 8.

If the semantic tag/semantic value pair associated with a newly added phrase is not the same as a pair along a common path at step 504, the process of FIG. 5 continues at step 508 where the grammar structure formed from the newly added phrase is compared to the grammar structure present before the phrase was added. This comparison locates the position of the first transition branch that was added to the previous structure when the new phrase was inserted in the structure.

At step 509, the results of this search are used to determine if the new semantic tag/semantic value pair will generate a semantic ambiguity in the grammar. In particular, if the new phrase does not create a newly added branch, the new semantic tag/semantic value pair will generate an ambiguity because there will be two different semantic pairs for the same phrase structure.

Under embodiments of the present invention, if an instruction to add a phrase would generate a semantic ambiguity in the grammar, the process continues at step 511 where the transitions added in step 502 are removed from the grammar. In addition, an error message is generated and is sent to the component that sent the instructions to add the phrase. This is especially helpful for an application that is dynamically building the grammar, because it allows the application to react to the error message at that point without having to wait for the entire grammar to be built.

If the added phrase does not generate a semantic ambiguity at step 509, the process continues at step 510 of FIG. 5 where the semantic tag/semantic value pair for the new phrase is placed at this first transition branch identified in step 508. Next, at step 512, the previous semantic tag/ semantic value pair found on the common path before the first transition branch is shifted back to each transition that extends from the same state as the first transition of the newly added branch. This shifting removes ambiguities that would otherwise arise if the existing semantic pair were maintained in the previous position. It also places all of the semantic pairs as far forward as possible in the rule structure.

Figure 9:
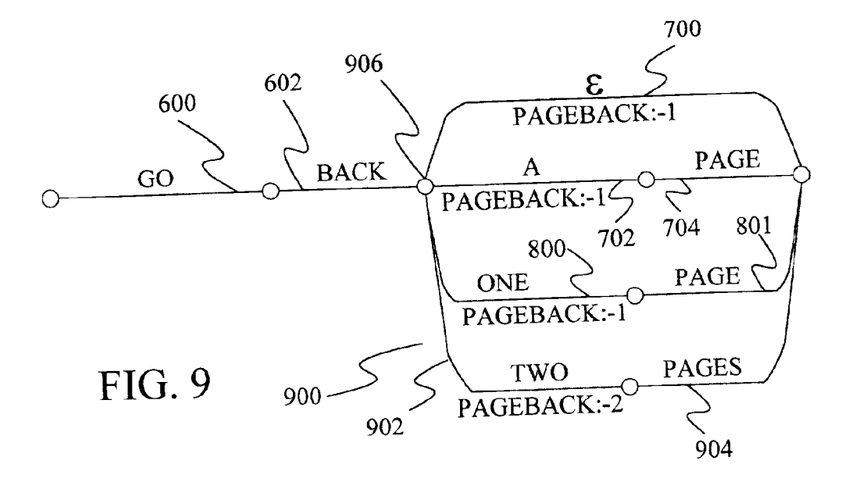
FIG. 9 shows the state diagram of FIG. 8 after an additional phrase has been added to the grammar rule.

An example of this semantic shifting is shown in FIG. 9 where the phrase "go back two pages" and the semantic pair "pageback:–2" have been added to the grammar structure of FIG. 8. Because "go back two pages" begins with the common sub-phrase "go back" the new phrase is added by inserting a branch 900 formed of transitions 902 and 904 that are associated with the words "two" and "pages" respectively.

Using steps 508 and 510 of FIG. 5, the semantic pair "pageback:-2" for the new phrase is placed at the first transition of the first newly added branch. In FIG. 9, this is transition 902 of branch 900. Using step 512, existing semantic pair "pageback:-1", which was associated with common transition 600 in FIG. 8, is shifted back to each of the transitions that extend from state 906. This is the same state from which new transition 900 extends. This involves placing the "pageback:-1" semantic pair on transitions 800, 702, and 704 in FIG. 9.

Figure 10:
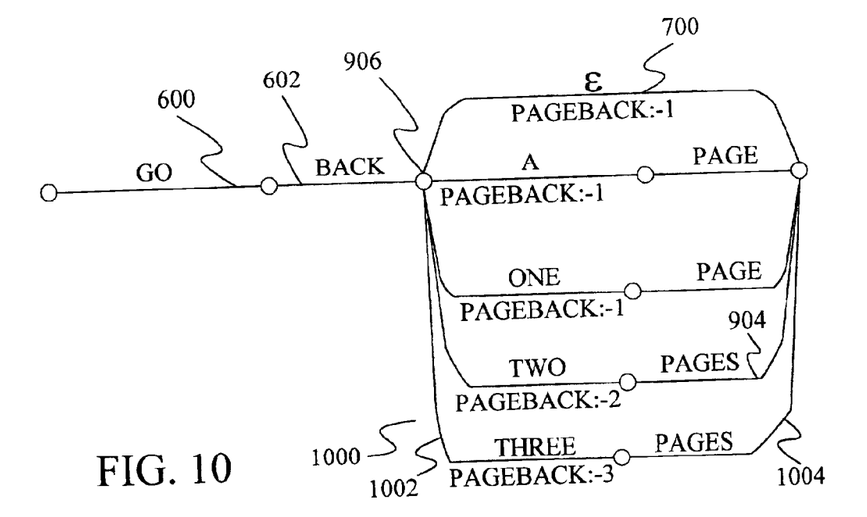
FIG. 10 shows the state diagram of FIG. 9 after an additional phrase has been added to the grammar rule.

FIG. 10 provides an example where an added phrase with a new semantic pair does not cause existing semantic pairs to be shifted. In FIG. 10, the phrase "go back three pages" and the semantic pair "pageback:-3" are added to the structure of FIG. 9. To add the phrase, a new branch 1000, which contains transitions 1002 and 1004, is added to the structure of FIG. 9. Using steps 508 and 510, the new semantic pair for the phrase is placed at transition 1002. Using step 512, the common path leading to transition 1002 is then checked to see if it contains any semantic pairs. Since the common path along transitions 600 and 602 does not contain a semantic pair in FIG. 9, there is no need to shift any of the semantic pairs.

Under some embodiments of the invention where a text-formatted grammar is converted into a binary grammar by compiler 310, the manner in which the grammar is specified in the text-formatted grammar can limit where the semantic pairs are shifted within the grammar structure. For example, in embodiments where phrases are found between pairs of phrase tags (for example <P>phrase</P>) a semantic pair that is defined in the leading phrase tag can only be shifted within the words of the phrase. For example, if the text-formatted grammar contained the entry "<P>go back</P><P pageback:-4>four pages</P>", the semantic pair "pageback:-4" could only be placed with the transition for the word "four" or transition for the word "pages". It could not be shifted to the transitions for "go" or "back".

Although the description of FIG. 5 above shows an embodiment in which the grammar is built based on separate instructions for each phrase, in other embodiments, the grammar is built from one instruction that makes reference to a collection of phrases. Under such embodiments, the semantic information is still shifted so that it is as far forward as possible in the grammar without introducing semantic ambiguity.

As noted in the background, most prior art speech recognition systems only pass semantic pairs to an application when a complete utterance had been recognized. This means that prior applications have to wait for the entire utterance and a silence period after the utterance before they can perform operations based on the speech input. Under the present invention, this delay is removed by shifting the semantic pairs as far forward in the grammar structure as possible and passing the semantic pairs to the application as the speech recognizer generates possible hypothesis words for the speech signal.

In some circumstances, where the risk of harm of taking a wrong action is outweighed by the confidence of the hypothesis, this allows applications to take action before the recognition is complete. By taking action before full recognition, these applications improve the user experience by providing quicker responses to user input.

For example, using the grammar rule of FIG. 10, if the speech recognition system identifies transitions 600, 602, and 700 as hypothesis transitions, the application can page back one page as soon as it receives the indication that transition 700 is a hypothesis transition. This can be done even if the confidence level for that transition is low, because the harm of paging back one page is small.

In particular, if the speech recognition engine later changes its hypothesis to transition 1000 instead of transition 700, no harm has been done by going back one page. In fact, by paging back one page during the hypothesis of transition 700, the application reduces the amount of time need to go back three pages, which is the likely response to transition 1002 being identified by the speech recognition engine.

Note that at other times, the application will wait to take an action even though it has received the semantic information. For example, if instead of first identifying transition 700 as the hypothesis transition, speech recognition engine identifies transition 1002, the application may page back one page but will likely not page back all three pages unless the confidence level of transition 1002 is high enough. If the confidence level of transition 1002 is low, the application may wait until the speech recognition engine indicates that transition 904 is a hypothesis transition before paging back all three pages. This will improve the user experience because the application will not page back three pages when the user only wanted to page back one or two pages.

In other embodiments, the application will use a risk/reward calculation that includes the stability of the semantic information that is sent to it. In such embodiments, the application will take an action if the semantic information remains constant for a number of consecutive hypotheses, but will not take the action if the semantic information is changing with each hypothesis. For example, if a hypothesis is being generated every 200 ms, then waiting for two semantically-unchanged hypotheses with reasonable confidence works well. If the confidence level was lower or the penalty higher, the application could wait for three or more semantically-unchanged hypotheses.

In other embodiments, the application takes the initialization period of the action into consideration when determining whether to start the action. Under these embodiments, those actions with longer initialization periods would require a lower confidence score and/or lower semantic stability.

In still other embodiments, where the penalty of an action prevents the application from taking the action without high confidence, the application provides user feedback while the confidence is still too low to indicate the action that the application is leaning toward. For example, if the application has a low confidence score for a cut operation, it may 'gray-out' the selection to indicate that it is considering a cut operation. If the confidence level increases, the cut operation is then performed. By providing such feedback, the present invention makes the system seem much more responsive to user input.

Although the present invention has been described with reference to particular embodiments, workers skilled in the art will recognize that changes may be made in form and detail without departing from the spirit and scope of the invention.

What is claimed is:

1. A computer-readable medium having computer-executable instructions for performing steps of:
   receiving at least one instruction to add a new phrase and semantic information associated with the new phrase to a recognition grammar;
   combining the new phrase with at least one other phrase in the grammar to form a single grammar structure;

associating the semantic information with a single recognition value in the new phrase by selecting the first possible recognition value in the new phrase that can be associated with the semantic information without introducing semantic ambiguity into the grammar structure.

2. The computer-readable medium of claim 1 wherein the step of combining comprises adding a branch to the grammar structure to represent at least one recognition value in the new phrase.

3. The computer-readable medium of claim 2 wherein associating the semantic information with a single recognition value in the new phrase comprises associating the semantic information with the first recognition value of the first branch added to the grammar structure for the new phrase.

4. The computer-readable medium of claim 3 wherein the computer-executable instructions are for performing further steps of:
identifying existing semantic information that was present in the grammar structure before the new phrase was added; and
shifting existing semantic information within the grammar structure so that the existing semantic information is not on a recognition value found in the new phrase.

5. The computer-readable medium of claim 4 wherein shifting existing semantic information comprises placing the semantic information on the first recognition value in each branch that is parallel to the branch added for the new phrase.

6. The computer-readable medium of claim 1 wherein the computer-executable instructions are for performing further steps of:
providing the grammar structure to a speech recognition engine;
receiving an indication of a hypothesis word recognized by the speech recognition engine based in part on the grammar structure; and
providing the semantic information associated with the hypothesis word to an application.

7. The computer-readable medium of claim 6 wherein the computer-executable instructions are for performing a further step of providing a confidence score to the application with the semantic information, the confidence score representing the probability that the hypothesis word has been properly recognized by the speech recognition engine.

8. The computer-readable medium of claim 7 wherein the computer-executable instructions include instructions defining the application and wherein the computer-executable instructions of the application are for performing a step of deciding whether to take an action before complete recognition of a phrase based on semantic information provided to the application with a hypothesis word.

9. The computer-readable medium of claim 8 wherein deciding whether to take an action before complete recognition comprises determining whether the risk of harm of taking the action is outweighed by the confidence score associated with the hypothesis word.

10. The computer-readable medium of claim 8 wherein deciding whether to take an action before complete recognition comprises determining whether the semantic information is sufficiently stable to take the action.

11. The computer-readable medium of claim 8 wherein the computer-executable instructions defining the application are for performing further steps of deciding not to take an action before complete recognition but deciding to provide user feedback indicating an action that could be taken based on the semantic information.

12. The computer-readable medium of claim 1 wherein the computer-executable instructions are for performing further steps comprising:
determining that the semantic information cannot be associated with a single recognition value without introducing semantic ambiguity into the grammar structure; and
returning an error message indicating that the semantic information would introduce semantic ambiguity into the grammar structure.

13. A speech recognition interface for a speech recognition engine, the interface comprising:
a grammar structure building component that receives instructions to add transitions to a grammar structure and in response adds transitions to a grammar structure; and
a semantic placement component that places semantic information associated with a current sequence of transitions on a first transition in the grammar structure that differentiates the current sequence of transitions from all other sequences of transitions in the grammar structure.

14. The speech recognition interface of claim 13 wherein the grammar structure building component adds transitions to the grammar structure by only adding a new transition if there are no existing transitions in the grammar structure that both extend from a same state as the new transition and have the same recognition value as the new transition.

15. The speech recognition interface of claim 14 wherein the semantic placement component additionally moves semantic information that is associated with at least one sequence of transitions other than the current sequence of transitions to avoid semantic ambiguity due to the addition of the current sequence of transitions.

16. The speech recognition interface of claim 15 wherein the semantic information moved by the placement component is found on a transition that forms part of the current sequence of transitions before it is moved.

17. The speech recognition interface of claim 16 wherein the semantic information moved by the placement component is found on a transition before the transition that differentiates the current sequence of transitions from all other transitions.

18. The speech recognition interface of claim 17 wherein the placement component moves the semantic information by associating the semantic information with each transition that extends from the same state as the transition that differentiates the current sequence of transitions from all other transitions.

19. The speech recognition interface of claim 13 further comprising:
a binary grammar building component that generates a compiled representation of the grammar structure; and
a context-free grammar engine that receives the compiled representation of the grammar structure and that provides the grammar structure to a speech recognition engine.

20. The speech recognition interface of claim 19 wherein the context-free grammar engine receives a hypothesis transition from the speech recognition engine before recognition of a complete utterance, identifies semantic information associated with the hypothesis transition, and provides the semantic information to an application.

21. A computer-readable medium having computer-executable instructions representing a speech-enabled application capable of performing steps of:

receiving semantic information associated with a hypothesis word identified by a speech recognition engine before an entire utterance has been recognized;

identifying a possible action to take based on the semantic information; and determining whether to take the action before the entire utterance has been recognized.

22. The computer-readable medium of claim 21 wherein the computer-executable instructions are capable of performing a further step of receiving a confidence score for the hypothesis word and wherein determining whether to take the action comprises balancing the confidence score with a risk of harm associated with incorrectly taking the action.

23. The computer-readable medium of claim 21 wherein receiving semantic information for a hypothesis comprises receiving semantic information for each hypothesis in a sequence of hypotheses and wherein determining whether to take the action comprises determining the stability of the semantic information across the sequence of hypotheses.

24. The computer-readable medium of claim 21 wherein determining whether to take the action comprises determining not to take the action and instead providing feedback to the user identifying the action that was not taken.

* * * * *